United States Patent
Mesaki

(10) Patent No.: US 8,946,559 B2
(45) Date of Patent: Feb. 3, 2015

(54) INSULATION-COATED ELECTRIC CONDUCTOR

(75) Inventor: Masakazu Mesaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 753 days.

(21) Appl. No.: 12/550,217

(22) Filed: Aug. 28, 2009

(65) Prior Publication Data

US 2010/0147551 A1 Jun. 17, 2010

Related U.S. Application Data

(63) Continuation of application No. 11/525,775, filed on Sep. 22, 2006, now abandoned, which is a continuation of application No. 11/138,740, filed on May 25, 2005, now abandoned, which is a continuation of application No. 09/969,291, filed on Oct. 1, 2001, now abandoned.

(30) Foreign Application Priority Data

Oct. 3, 2000 (JP) ................................. 2000-304211

(51) Int. Cl.
| | |
|---|---|
| *H01B 7/00* | (2006.01) |
| *C09D 179/00* | (2006.01) |
| *C09D 167/00* | (2006.01) |
| *C09D 179/08* | (2006.01) |
| *H01B 3/30* | (2006.01) |
| *H01B 3/42* | (2006.01) |
| *H01B 7/02* | (2006.01) |
| *H02K 3/30* | (2006.01) |
| *H02K 3/50* | (2006.01) |
| *H02K 15/00* | (2006.01) |

(52) U.S. Cl.
CPC ............ *C09D 179/00* (2013.01); *C09D 167/00* (2013.01); *C09D 179/08* (2013.01); *H01B 3/306* (2013.01); *H01B 3/42* (2013.01); *H01B 3/421* (2013.01); *H01B 7/0208* (2013.01); *H02K 3/30* (2013.01); *H02K 3/50* (2013.01); *H02K 15/0056* (2013.01)
USPC ................. 174/126.2; 174/110 R; 174/120 R; 174/121 SR

(58) Field of Classification Search
USPC ........... 174/36, 110 R, 120 R, 120 C, 120 FP, 174/121 R, 121 SR
See application file for complete search history.

(56) References Cited

U.S. PATENT DOCUMENTS

| | | | | |
|---|---|---|---|---|
| 6,436,537 | B1 * | 8/2002 | Mesaki et al. | ................. 428/379 |
| 6,734,361 | B2 * | 5/2004 | Mesaki et al. | ............ 174/110 R |

OTHER PUBLICATIONS

Japan Copper and Brass Association, "Dou oyobi Dougoukinn no Kiso to Kougyou Gijutsu (Basic and Industrial Technology of Copper and Copper Alloy)" p. 354, 355, 380, 381 1988.
Journal of Japan Copper and Brass Research Association, "Welding of copper and copper alloys", p. 1-12, 1979.

(Continued)

*Primary Examiner* — William H Mayo, III
(74) *Attorney, Agent, or Firm* — Birch, Stewart, Kolasch & Birch, LLP

(57) ABSTRACT

A multilayer insulation-coated electric conductor for a coil constituting a circuit by forming a welded portion in the coil, wherein at least one layer of the multilayer insulation-coating layers of the coated metal conductor is composed of at least one resin selected from the group consisting of a polyimide resin, a polyesterimide resin, and an H-class polyester resin.

18 Claims, 1 Drawing Sheet

(56) References Cited

OTHER PUBLICATIONS

Report of Analysis, An examination regarding a temperature distribution at a period of welding a flat type enameled wire. 2009.
Written Refutation in Japanese Appeal No. 2008-800277.
2 Written Refutation in Japanese Appeal No. 2008-800278.
Transmittal Notice, Written Amendment, Invalidity Proceeding 2011-800010.
Transmittal Notice, Written Demand for Trial, Invalidity Proceeding 2011-800010.
Written Demand for Trial, Invalidity Proceeding 2011-800010.
Written Amendment, Invalidity Proceeding 2011-800010.

* cited by examiner

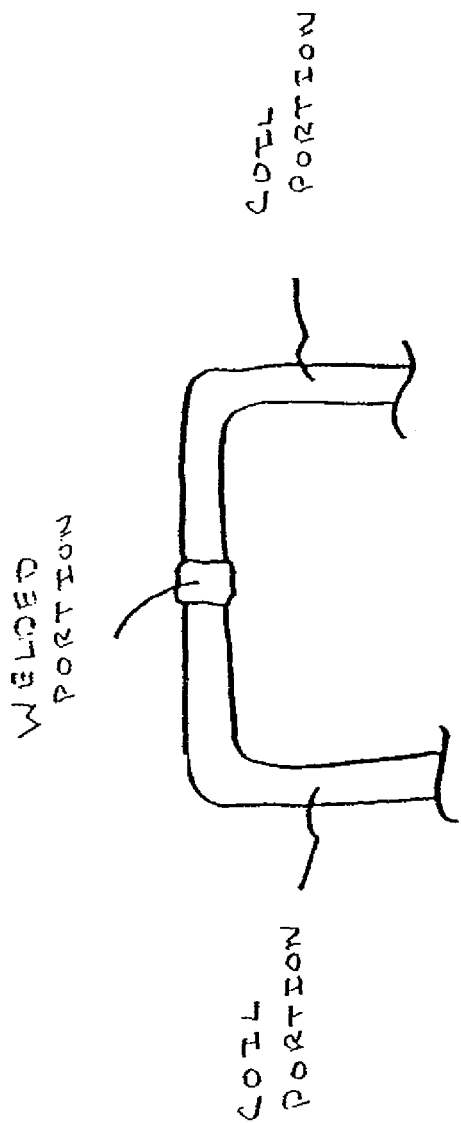

INSULATION-COATED ELECTRIC CONDUCTOR

CROSS REFERENCE TO RELATED APPLICATIONS

This application is a continuation of U.S. patent application Ser. No. 11/525,775 filed Sep. 22, 2006, now abandoned, which is a continuation of U.S. patent application Ser. No. 11/138,740 filed May 25, 2005, now abandoned which is a continuation of U.S. patent application Ser. No. 09/969,291 filed on Oct. 1, 2001, now abandoned, each entitled Insulation-Coated Electric Conductor. Each of these applications is hereby incorporated by reference in its entirety.

BACKGROUND OF THE INVENTION

1. Field of the Invention

The present invention relates to an insulation-coated electric conductor.

2. Description of the Related Art

A conductor coated with an electrical insulating material is incorporated in a variety of electric machinery and tools and used in large quantity for uses for coils. It is especially abundantly used in electric machinery and tools as represented by motors and generators. A winding, having a conductor whose cross-section has a non-round shape, and being spirally covered with, as a coating material, an insulating material, such as glass and paper, has conventionally been used. Such a winding has been used for parts of machinery and tools required to have extremely high reliability, such as for coils for generators of power plants, coils for transformers, coils for vehicular driving motors, and the like.

Recently, a winding having a conductor whose cross-section has a non-round shape, such as an approximately rectangular shape, tends to be used also in machinery and tools smaller than the machinery and tools described above. Even in these small machinery and tools, they are required to be made high performance in a shape of coil. Accordingly, a method for forming a coil by joining coated conductors together each having a cross-section shape corresponding to the coil shape, tends to be employed as the coil production method, in stead of the conventional method for producing a coil by winding an electric wire circumferentially with a coil, a so-called wire-winding. Employment of such a winding of a conductor with a shape other than round in a small machinery and tools is developed, because a gap between the winding and a core of the coil can be eliminated and magnetic field loss can be lessened, to resultantly improve performance of the coil, and also because the coil to be used in a small machinery and tools can further be miniaturized. Making the conductor have a shape other than round makes it difficult to wind a long electric wire, as it is, directly onto a core of a coil, when forming a coil-like circuit. Therefore, a technique which has recently been employed involves steps of, at first, forming short conductors into partial shapes of a coil, and then forming an entire circuit by welding the conductors to join together.

To form such a coil, the conductors are required to be connected to one another. To connect the conductors, the parts where soldering has conventionally been conducted are to be subjected to an electric welding method, such as fusing (electric welding while applying pressure), TIG welding, and the like. This is because, it is recently required to use a material having the same level of performance as a conductor (such as copper) currently used, as a connection material, since with a conventionally employed soldering, a serious environmental effect is caused by lead or the like contained in the solder, when used products are discarded, and also the soldered parts are inferior in reliability to vibration of machinery and tools.

Conventionally, as coating materials to be used for round enameled wires, a variety of resins, such as polyesters, have been used. However, since the conductors are to be connected to one another by directly heating the conductors and melting them in fusing and TIG welding, the insulation coating on the periphery of the connected portion is heated to an extremely high temperature, to receive considerable thermal deterioration. For example, to connect copper pieces to each other by usual welding, the temperature of the copper pieces must be increased to the melting point of copper or higher, and for that, the conductor temperature is increased to about 1,100° C. or higher. The increase of the conductor temperature causes thermal deterioration of the insulation coating on the periphery of the connected portion of the conductors, and further, low-molecular-weight components in the coating material are evaporated by the heat, to result in blistering (foaming) in the coating. As a result, the electric properties of the coating material on the periphery of the connected portion are possibly deteriorated in some cases. That such welding heat affects the coating has been well known, and to lessen the effect is necessary also, to improve the reliability of electric machinery and tools. If the conductor temperature reaches 1,100° C. in a welded portion, the heat that a coating, required to have insulating properties, receives reaches as high as about 600° C. at 10 mm distance from the welded portion. Further, the above-described blistering of the coating cannot be avoided if polyamideimide resin, which has conventionally been used, is used solely.

SUMMARY OF THE INVENTION

The present invention is a multilayer insulation-coated electric conductor, which can be used in a coil that constitutes a circuit by forming a welded portion in the coil, wherein at least one layer of the multilayer insulation-coating layers of the coated metal conductor is composed of at least one resin selected from the group consisting of a polyimide resin, a polyesterimide resin, and an H-class polyester resin.

Other and further features and advantages of the invention will appear more fully from the following description.

BRIEF DESCRIPTION OF THE DRAWING

FIG. 1 is an illustration of smaller conductors being welded to form a larger coil.

DETAILED DESCRIPTION OF THE PREFERRED EMBODIMENT

The inventor of the present invention has paid attention to the materials of coatings of coated electric conductors, and found a novel coating constitution that is durable to heat at the time of welding, and that causes no abnormality, such as blistering in the coating.

Regarding the coating constitution durable to the heat at the time of welding, the present inventor focused on the only momentary application of heat at the time of welding, and investigated heat resistance (instantaneous heat resistance) of the coating. The present inventor has confirmed the following with respect to the instantaneous heat resistance of the coating: That heat is conducted from the conductor side at the time of welding the conductor; that the material of the coating formed nearest to the conductor side is most deteriorated by the heat; and that the decomposition gas generated in the coating material in the conductor side causes voids and blisters (fine foams) in the entire coating layers. Therefore, to deal with the occurrence of voids or the like, the present inventor has studied to use a material that is not softened even if coating is heated, for some parts of the coating, and I have consequently found that the above-described conventional problems can be solved by using a specific material (a polyimide, polyesterimide, or H-class polyester resin) partially for the coating. The present invention has been achieved based on these findings.

That is, according to the present invention, there is provided the following means:

1) A multilayer insulation-coated electric conductor for a coil constituting a circuit by forming a welded portion in the coil as shown in FIG. 1, wherein at least one layer of the multilayer insulation-coating layers of the coated metal conductor is composed of at least one resin selected from the group consisting of a polyimide resin, a polyesterimide resin, and an H-class polyester resin;

2) The coated metal conductor according to the item (1), wherein the uppermost layer of the multilayer insulation-coating layers is composed of a polyamideimide resin, and wherein an under insulation-coating layer adjacent to the uppermost layer is composed of at least one resin selected from the group consisting of a polyimide resin, a polyesterimide resin, and an H-class polyester resin;

3) The coated metal conductor according to the item (1) or (2), wherein the lowermost layer of the insulation-coating layers of the multilayer insulation-coated electric conductor is composed of a polyamideimide resin;

4) The coated metal conductor according to any one of the items (1) to (3), wherein the metal conductor is low-oxygen copper with an oxygen content of 30 ppm or lower, or an oxygen-free copper; and 5) The coated metal conductor according to any one of the items (1) to (4), wherein a cross-section of the conductor has a shape other than round.

The reasons why the functions/effects of the present invention can be exhibited are not made clear, but it is assumed that the polyimide resin is less in decrease of elastic modulus even at a high temperature as compared with that at a room temperature, and that the polyesterimide resin and the H-class polyester resin have high initial elastic modulus and are scarcely softened even at a high temperature.

The polyimide resin that can be used for forming a part of the coating layers in the present invention, is not particularly restricted, and use can be made of the well-known polyimide resins, such as aromatic polyimides (API) and thermosetting aromatic polyimide. For example, use can be made of either commercially available products (e.g. trade name, #3000, produced by Toray-Du Pont Co., Ltd.) or those that can be obtained by imidation of a polyamide acid by heating at the time of baking in the coating formation, by using a polyamide acid solution obtainable by reacting an aromatic tetracarboxylic acid dianhydride and an aromatic diamine in a polar solvent, in a usual manner.

Further, as the polyesterimide resin, use can be made of the well-known polyesterimide resins that can be obtained by introducing an ester bond into the main chain of a polyimide. As a commercially available product, for example, Isomid 40SH (trade name, produced by Nisshoku Schenectady Kagaku Inc.) can be mentioned.

In the present invention, the H-class polyester resin means an aromatic polyester that is modified by adding, for example, a phenol resin and that has heat resistance of H-class (IEC). As the H-class polyester resin commercially available, mention can be made of Isonel200 (trade name, produced by U.S. Schenectady International Co.)

Further, as the polyamideimide resin that can be used for forming the uppermost layer or the lowermost layer, use can be made of either a commercially available product (for example, trade name, HI406, produced by Hitachi Chemical Co., Ltd.), or those that can be, for example, obtained by direct reaction of a tricarboxylic acid anhydride and a diisocyanate in a polar solvent or obtained by reacting tricarboxylic acid anhydride with a diamine in a polar solvent to introduce imide bonds and then carrying out amidation with a diisocyanate, in a usual manner. The polyamideimide resin is low in thermal conductivity and high in dielectric breakdown voltage, as compared with other resins, and it is possible to be hardened by baking.

In the coated metal conductor of the present invention, as described above, the foregoing polyamideimide resin can be used in the uppermost layer among the insulation-coating layers. By using the polyamideimide resin in the uppermost layer adjacent to an insulation-coating layer composed of at least one resin selected from the group consisting of the polyimide resin, the polyesterimide resin, and the H-class polyester resin, even if being subjected to strong bending, the resultant coating layers can solve the trouble caused by film elongation, such as crazing and cracks of film.

As the resin for forming the uppermost layer of the coating of the conductor of the present invention, use can be also made of a self-lubricating resin containing wax or a lubricant mixed with or dispersed in, by a usual manner. As the wax that can be used for that, any commonly employed one can be employed without any restrictions, and the examples thereof include synthetic waxes, such as polyethylene wax, petroleum wax, and paraffin wax, and natural waxes, such as carnauba wax, candelilla wax, and rice wax. Also as the lubricant, any one of known lubricants can be employed without particular restrictions, and the examples of the lubricant that can be employed include silicone, silicone macromonomers, and fluororesins. In the coated electric conductor of the present invention, the formation method of the resin for forming each resin layer of the coating is not particularly restricted and a variety of known methods can be employed.

Further, in the insulation-coated electric conductor of the present invention, preferably, the lowermost layer among the insulation-coating layers is composed of the polyamideimide resin, and through another resin layer or directly on the lowermost layer, an insulation-coating layer composed of at least one resin selected from the group consisting of the polyimide resin, the polyesterimide resin, and the H-class polyester resin, can be provided. According to the resultant coated metal conductor having the constitution of the above insulation-coating layers, such function is exhibited that the insulation film is difficult to cause thermal deterioration, to the heat transmitted from the conductor side when the insulation-coated electric conductor is employed in a motor or a transformer. The above another resin layer (intermediate layer) may be composed of any resin without particular restriction, but it is preferable to use, for example, the above-described at least one resin selected from the group consisting of the polyimide resin, the polyesterimide resin, and the H-class polyester resin, as the another resin.

In the insulation-coated electric conductor of the present invention, the number of the layer of the insulation-coating layers formed on the electric conductor is not particularly limited, but the layer constitution is preferably composed of four layers or less, more preferably three or two layers.

A resin varnish for coating is coated and baked on the conductor, and the coated electric conductor can be obtained.

As a conductor, a conventionally known conductor can be used. Preferably low-oxygen copper with an oxygen content of 30 ppm or lower, more preferably low-oxygen copper with an oxygen content of 20 ppm or lower, or oxygen-free copper can be used as a conductor. If the oxygen content is 30 ppm or lower, when the conductor is melted by heat for welding, no void due to the oxygen contained in the copper is occurred in the welded portion. Therefore the electric resistance in the welded portion can be prevented from being deteriorated. In addition, the mechanical strength of the welded portion can be maintained.

Further, conductors having any desired cross-sectional shape can be used. The conductor having a shape other than round is preferably used, and especially preferably the conductor of a rectangular shape is used.

A usual manner can be employed as the method for coating a resin varnish containing the above resin(s) onto the conductor. For example, a method using a die having a similar shape to the conductor shape can be employed for varnish coating, or if the cross-section shape of the conductor is square, a die, a so-called "universal die", formed in a lattice form may be employed. The conductor coated with the resin varnish can be baked in a baking furnace also by a usual manner. Although depending on the shape and the like of the furnace to be employed, concrete baking conditions are set to be at a temperature of 400 to 500° C. with a passing time of 30 to 90 seconds to complete baking, if a natural convection-type vertical furnace of about 5 m in furnace length.

In the present invention, the thickness of the layer composed of at least one of the foregoing polyimide resin, polyesterimide resin, and H-class polyester resin is not particularly restricted, but it is preferably 4 to 35 μm, more preferably 5 to 18 μm. Further, the total thickness of the polyamideimide resin layer is preferably 10 to 40 μm and more preferably 10 to 35 μm, in a whole coating.

The thickness of the entire coating film is generally about 15 to about 55 μm and preferably 25 to 50 μm.

The insulation-coated electric conductor of the present invention is preferable for composing a coil in a motor or a generator, and it is durable to welding heat when composing a circuit by providing a welded portion in the circuit of the coil.

Further, the coated electric conductor of the present invention has excellent instantaneous heat resistance, and it causes no void or blister in the coating film even at the time of working such as welding of the conductor in which heat at a high temperature is applied under severe conditions during the coil production process, and good properties (soundness) can be maintained, so that the resultant insulated wire in which the insulation-coated electric conductor is used can be protected from deterioration. Further, in the case of using the coated metal conductor, thermal deterioration of the insulation-coating film hardly takes place even by the heat transmitted from the conductor side, thereby a coil high in reliability can be provided. The above matters consequently result in such excellent effects to be exhibited that the coated metal conductor contributes to provide the entire machinery and tools themselves using the coil, in which the coated metal conductor of the present invention is used, with improved performance and with increased reliability to the machinery and tools.

The present invention will be described in more detail based on the following examples, but the invention is not limited to these.

EXAMPLES

The constitutions of the resin coatings of the following examples and comparative examples are collectively shown in Table 1 and Table 2. The results of the evaluation tests for the resin coated conductors obtained in the following manners are shown in Table 3 to Table 5.

Example 1

A polyamideimide resin (PAI) (trade name HI406, produced by Hitachi Chemical Co., Ltd.), a polyimide resin (PI) (trade name #3000, produced by Toray-Du Pont Co., Ltd.), and a polyamideimide resin (PAI) (trade name HI406, produced by Hitachi Chemical Co., Ltd.) were used for forming coatings, successively from the lowermost layer in this order, on a rectangular conductor (copper with oxygen content of 15 ppm) chamfered in four corners with the radius r=0.5 mm and having the size 1.8 mm×2.5 mm (thickness×width), and the total thickness of the coating film was made to be 45 μm. The thickness of each coating was as shown in Table 1. A plurality of dies with similar shape to the conductor shape were used for the coating-film formation, and in a baking furnace of 8-m furnace length, baking at 450° C. with a baking time for about 15 seconds was repeated a plurality of times, to obtain a resin-coated conductor. The results of the following evaluation tests carried out for the resin-coated conductor are shown in Table 3.

Examples 2, 3

The resins were used in the same manner as those of the above Example 1, and the baking conditions for the resin-coating were also made the same to the Example 1. However, the thickness of each coating was changed as shown in Table 1. The results of the evaluation tests carried out for the thus-obtained resin-coated conductors are shown in Table 3.

Comparative Example 1

A polyamideimide resin (PAI) (trade name HI406, produced by Hitachi Chemical Co., Ltd.) was used for forming a coating, on a rectangular conductor (copper with the same quality as that of Example 1) chamfered in four corners with the radius r=0.5 mm and having the size 1.8 mm×2.5 mm, and the total thickness of the coating was made to be 45 μm. A plurality of dies with similar shape to the conductor shape were used for the coating-film formation, and in a baking furnace of 8-m furnace length, baking at 450° C. with a baking time for about 15 seconds was repeated a plurality of times. The results of the evaluation tests carried out for the thus-obtained resin-coated conductor are shown in Table 3.

TABLE 1

|  | Example 1 | Example 2 | Example 3 | Comparative example 1 |
|---|---|---|---|---|
| Conductor size (mm × mm) |  | 1.8 × 2.5 |  |  |
| Radius of four corners of conductor (mm) |  | 0.5 |  |  |

TABLE 1-continued

|  | Example 1 | Example 2 | Example 3 | Comparative example 1 |
|---|---|---|---|---|
| Total coating thickness (μm) | 45 | 45 | 45 | 45 |
| Coating thickness of lower layer (μm) | PAI(HI406) 18 | PAI(HI406) 25 | PAI(HI406) 25 | PAI(HI406) 30 |
| Coating thickness of middle layer (μm) | PI (3000) 17 | PI (3000) 10 | PI (3000) 5 | — |
| Coating thickness of upper layer (μm) | PAI(HI406) 10 | PAI(HI406) 10 | PAI(HI406) 15 | PAI(HI406) 15 |

Example 4

An H-class polyester resin (HPE) Isonel200 (trade name, produced by U.S. Schenectady International Co.) and a polyamideimide resin (PAI) (trade name HI406, produced by Hitachi Chemical Co., Ltd.) were used for forming coatings, in this order from the lowermost layer, onto a rectangular conductor (copper with oxygen content of 20 ppm) chamfered in four corners with the radius r=0.8 mm and having the size 2.0 mm×3.0 mm, and the total thickness of the coatings was made to be 50 μm. The thickness of each coatings is shown in Table 2. A plurality of dies with similar shape to the conductor shape were used for the coating-film formation, and in a baking furnace of 8-m furnace length, baking at 450° C. with a baking time for about 20 seconds was repeated a plurality of times. The results of the evaluation tests carried out for the thus-obtained resin-coated conductor are shown in Table 4.

Example 5

The resins were used in the same manner as those of the above Example 4, and the baking conditions for the resin coatings were also the same to the Example 4. However, the thickness of each coating was changed as shown in Table 2. The results of the evaluation tests carried out for the thus-obtained resin-coated conductor are shown in Table 4.

Comparative Example 2

An H-class polyester resin (HPE) Isonel200 (trade name, produced by U.S. Schenectady International Co.) was used for forming a coating, onto a rectangular conductor (copper with the same quality as that of Example 4) chamfered in four corners with the radius r=0.8 mm and having the size 2.0 mm×3.0 mm, and the total thickness of the coating was made to be 50 μm. A plurality of dies with similar shape to the conductor shape were used for the coating-film formation, and in a baking furnace of 8-m furnace length, baking at 450° C. with a baking time for about 20 seconds was repeated a plurality of times. The results of the evaluation tests carried out for the thus-obtained resin-coated conductor are shown in Table 4.

Example 6

A polyamideimide resin (PAI) (trade name HI406, produced by Hitachi Chemical Co., Ltd.), a polyesterimide resin (PEI) Isomid 40SH (trade name, produced by Nisshoku Schenectady Kagaku Inc.), and a polyamideimide resin (PAI) (trade name HI406, produced by Hitachi Chemical Co., Ltd.) were used, in this order from the lowermost layer, for successively forming a three-layer coating structure, onto a rectangular conductor (copper with oxygen content of 15 ppm) with the radius r=0.6 mm in four corners chamfered and having the size 1.5 mm×2.4 mm, and the total thickness of the coatings was made to be 35 μm. The thickness of each of the coatings is shown in Table 2. A plurality of dies with similar shape to the conductor shape were used for the coating-film formation, and in a baking furnace of 8-m furnace length, baking at 450° C. with the baking time of about 20 seconds was repeated a plurality of times. The results of the evaluation tests carried out for the thus-obtained resin-coated conductor are shown in Table 5.

Example 7

A polyesterimide resin (PEI) Isomid 40SH (trade name, produced by Nisshoku Schenectady Kagaku Inc.) and a polyamideimide resin (PAI) (trade name HI406, produced by Hitachi Chemical Co., Ltd.) were used for successively forming coatings, in this order from the lowermost layer, onto rectangular conductor (copper with the same quality as that of Example 6) with the radius r=0.6 mm in four corners chamfered and having the size 1.5 mm×2.4 mm, and the total thickness of the coatings was made to be 35 μm. The thickness of each coatings is shown in Table 2. A plurality of dies with similar shape to the conductor shape were used for the coating-film formation, and in a baking furnace of 8-m furnace length, baking at 450° C. with the baking time of about 20 seconds was repeated a plurality of times. The results of the evaluation tests carried out for the thus-obtained resin-coated conductor are shown in Table 5.

Comparative Example 3

A polyester imide resin (PEI) Isomid 40SH (trade name, produced by Nisshoku Schenectady Kagaku Inc.) was used for forming a coating, onto a rectangular conductor (copper with the same quality as that of Example 6) with the radius r=0.6 mm in four corners chamfered and having the size 5 mm×2.4 mm, and the total thickness of the coating was made to be 35 μm. A plurality of dies with similar shape to the conductor shape were used for the coating-film formation, and in a baking furnace of 8-m furnace length, baking at 450° C. with the baking time of about 20 seconds was repeated a plurality of times. The results of the evaluation tests carried out for the thus-obtained resin-coated conductor are shown in Table 5.

TABLE 2

|  | Example 4 | Example 5 | Comparative example 2 | Example 6 | Example 7 | Comparative example 3 |
|---|---|---|---|---|---|---|
| Conductor size (mm × mm) |  | 2.0 × 3.0 |  |  | 1.5 × 2.4 |  |
| Radius of four corners of conductor (mm) |  | 0.8 |  |  | 0.6 |  |
| Total coating thickness (μm) | 50 | 50 | 50 | 35 | 35 | 35 |
| Coating thickness of lower layer (μm) | HPE (Isonel200) 40 | HPE (Isonel200) 25 | HPE (Isonel200) 50 | PAI (HI406) 10 | PEI (Isomid40SH) 25 | PEI (Isomid40SH) 35 |
| Coating thickness of middle layer (μm) | — | — | — | PEI (Isomid40SH) 15 | — | — |
| Coating thickness of upper layer (μm) | PAI (HI406) 10 | PAI (HI406) 25 | — | PAI (HI406) 10 | PAI (HI406) 10 | — |

Evaluation Methods
Bending (Edgewise Bending)

Bending (edgewise bending) was carried out at 180° in the direction of the edge face of the coated conductor. The bending radius was made to be the same as the width in the width-wise (transverse) direction of the conductor (1-w bending). After such bending was carried out, a pin hole test according to JIS C3003 was carried out, to examine occurrence of pin holes. The term, "good", means no coating crack was observed when bending and no pin hole was formed.

Instantaneous Heat Resistance (Fusing)

The dry area (spot) of the coating film immediately neighboring to the welded portion was observed when welding was carried out in the electric current conditions, as described in Tables 3 to 5, while crossing orthogonally the flat faces of the two coated conductors brought into contact with each other and sandwiching the crossing portion with electrodes from the upper and lower sides. The term, "good", means no void was observed and no burning took place.

Instantaneous Heat Resistance (TIG Welding)

The coating only at one end portion in 5-mm length of the two coated conductors was peeled, and the resultant conductors were aligned parallel to fix the peeled faces with the edge faces thereof being brought into contact with each other, and the resulting butt faces of the conductors were welded by TIG welding. The conditions are as shown in Tables 3 to 5. The dry area (spot) of the coating film immediately neighboring to the welded face portion in that case was observed. The term, "good", means no void was observed and no burning took place.

Dielectric Breakdown Voltage

The test was carried out employing a metal foil method as described in JIS C3003. The average values of the results n=5 are shown in Tables 3 to 5. Separately, the test was carried out for samples after left to stand in a thermostatic chamber at 230° C. for 5 days.

TABLE 3

|  | Example 1 | Example 2 | Example 3 | Comparative example 1 |
|---|---|---|---|---|
| Bending property Edgewise bending 2.5φ mm 180° (Pin hole) | Good (None) | Good (None) | Good (None) | Cracks of the coating film were observed. (Pin holes were occurred.) |
| Instantaneous heat resistance Fusing 200 A × 0.5 second | Good | Good | Good | Voids were observed in the coating film. |
| Instantaneous heat resistance TIG welding 220 A × 0.5 second | Good | Good | Good | Voids about 1 mm size were observed. |
| Dielectric breakdown voltage (kV) | 6.5 | 6.8 | 7.0 | 6.5 |
| Dielectric breakdown voltage after 230° C. × 5 days (kV) (remaining ratio: %) | 5.8 (90) | 6.2 (91) | 6.3 (90) | 4.4 (68) |

TABLE 4

|  | Example 4 | Example 5 | Comparative example 2 |
|---|---|---|---|
| Bending property Edgewise bending 3.0φ mm 180° (Pin hole) | Good (None) | Good (None) | Cracks of the coating film were observed. (Pin holes were occurred.) |
| Instantaneous heat resistance Fusing 200 A × 0.5 second | Good | Good | Voids were observed in the coating film. |
| Instantaneous heat resistance TIG welding 220 A × 0.5 second | Good | Good | Voids about 2.0 mm size were observed. |
| Dielectric breakdown voltage (kV) | 7.0 | 7.3 | 7.2 |
| Dielectric breakdown voltage after 230° C. × 5 days (kV) (remaining ratio: %) | 5.3 (75) | 5.8 (79) | 2.4 (33) |

TABLE 5

|  | Example 6 | Example 7 | Comparative example 3 |
|---|---|---|---|
| Bending property Edgewise bending 2.4φ mm 180° (Pin hole) | Good (None) | Good (None) | Cracks of the coating film were observed. (Pin holes were occurred.) |
| Instantaneous heat resistance Fusing 200 A × 0.5 second | Good | Good | Voids were observed in the coating film. |
| Instantaneous heat resistance TIG welding 220 A × 0.5 second | Good | Good | Voids about 2.5 mm size were observed. |
| Dielectric breakdown voltage (kV) | 5.7 | 4.8 | 5.1 |
| Dielectric breakdown voltage after 230° C. × 5 days (kV) (remaining ratio: %) | 4.3 (90) | 4.1 (77) | 2.6 (51) |

Having described our invention as related to the present embodiments, it is our intention that the invention not be limited by any of the details of the description, unless otherwise specified, but rather be construed broadly within its spirit and scope as set out in the accompanying claims.

What is claimed is:

1. A multilayer insulation-coated electric conductor to be formed into partial shapes of a coil that are to be joined by welding, comprising:
    a conductor made of oxygen free copper or low-oxygen copper with an oxygen content of 30 ppm or lower,
    an uppermost insulation layer comprising a polyamideimide resin; and
    an under insulation layer adjacent to the uppermost layer, wherein the under insulation layer consists of an H-class polyester resin;
    wherein the multilayer insulation-coated electric conductor shows welding temperature resistance at a portion close to a welded portion receiving heat increased to about 1,100° C. or higher during the welding process.

2. The multilayer insulation-coated metal conductor according to claim 1, comprising a lowermost insulation layer beneath the under insulation layer and adjacent to the metal conductor, wherein the lowermost layer consists of a polyamideimide resin.

3. The multilayer insulation-coated metal conductor according to claim 2, wherein the metal conductor is made of oxygen free copper or low-oxygen copper with an oxygen content of 15 ppm or lower.

4. The multilayer insulation-coated metal conductor according to claim 2, wherein a cross-section of the conductor has a shape other than round.

5. The multilayer insulation-coated metal conductor according to claim 2, wherein the cross-section of the conductor has a rectangular shape.

6. The multilayer insulation-coated metal conductor according to claim 1, wherein the underlayer is adjacent to the metal conductor.

7. The multilayer insulation-coated metal conductor according to claim 6, wherein the metal conductor is made of oxygen free copper or low-oxygen copper with an oxygen content of 15 ppm or lower.

8. The multilayer insulation-coated metal conductor according to claim 6, wherein a cross-section of the conductor has a shape other than round.

9. The multilayer insulation-coated metal conductor according to claim 6, wherein the cross-section of the conductor has a rectangular shape.

10. A multilayer insulation-coated electric conductor to be formed into partial shapes of a coil that are to be joined by welding, comprising:
    a conductor made of oxygen free copper or low-oxygen copper with an oxygen content of 30 ppm or lower,
    an uppermost insulation layer consisting of comprising a polyamideimide resin; and
    an under insulation layer adjacent to the uppermost layer, wherein the under insulation layer consists of a polyesterimide resin;
    wherein the multilayer insulation-coated electric conductor shows welding temperature resistance at a portion close to a welded portion receiving heat increased to about 1,100° C. or higher during the welding process.

11. The multilayer insulation-coated metal conductor according to claim 10, comprising a lowermost insulation layer beneath the under insulation layer and adjacent to the metal conductor, wherein the lowermost layer consists of a polyamideimide resin.

12. The multilayer insulation-coated metal conductor according to claim 11, wherein the metal conductor is made of oxygen free copper or low-oxygen copper with an oxygen content of 15 ppm or lower.

13. The multilayer insulation-coated metal conductor according to claim 11, wherein a cross-section of the conductor has a shape other than round.

14. The multilayer insulation-coated metal conductor according to claim 11, wherein the cross-section of the conductor has a rectangular shape.

15. The multilayer insulation-coated metal conductor according to claim 10, wherein the underlayer is adjacent to the metal conductor.

16. The multilayer insulation-coated metal conductor according to claim 15, wherein the metal conductor is made of oxygen free copper or low-oxygen copper with an oxygen content of 15 ppm or lower.

17. The multilayer insulation-coated metal conductor according to claim 15, wherein a cross-section of the conductor has a shape other than round.

18. The multilayer insulation-coated metal conductor according to claim 15, wherein the cross-section of the conductor has a rectangular shape.

* * * * *